June 11, 1968     L. M. HARVEY ETAL     3,387,481

PROCESS FOR THE DEFORMATION OF SHEET MATERIAL

Original Filed Dec. 11, 1964     3 Sheets-Sheet 1

INVENTORS.
LEO M. HARVEY
RALPH W. HILTON
BY

Attorney

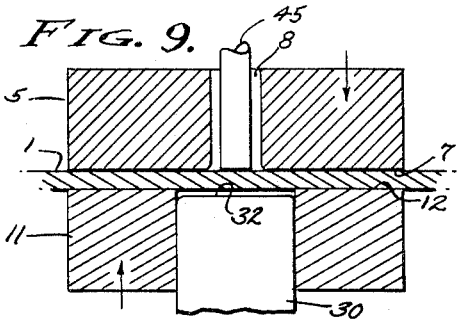
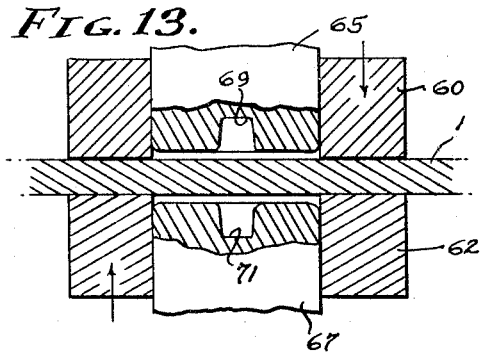
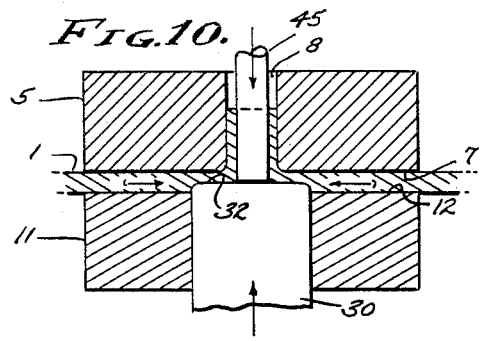
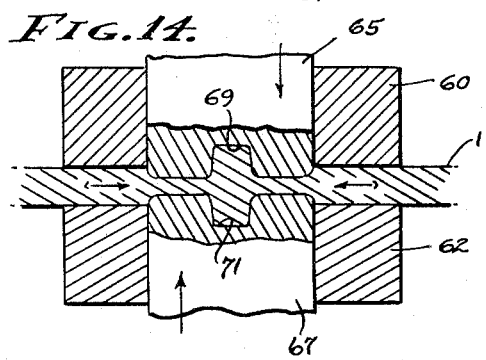
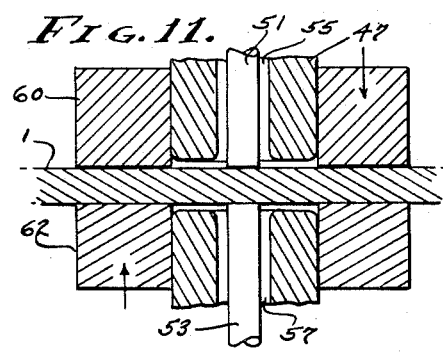
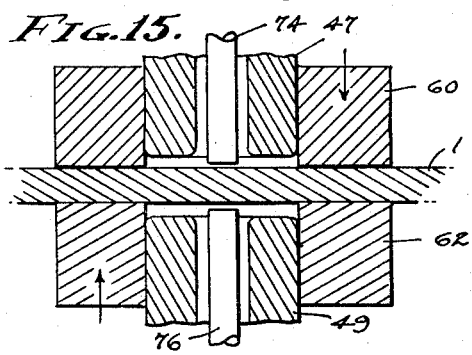
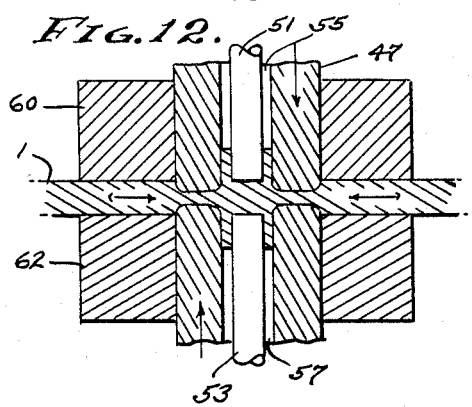
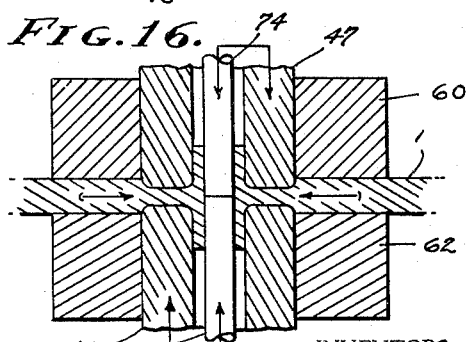

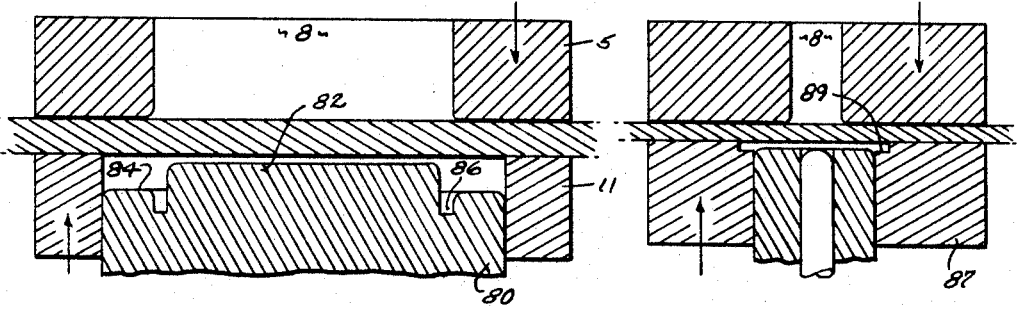
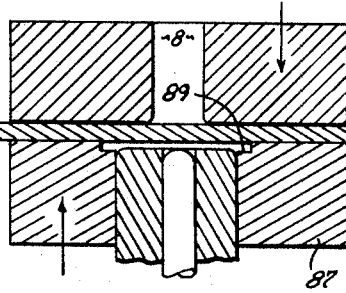
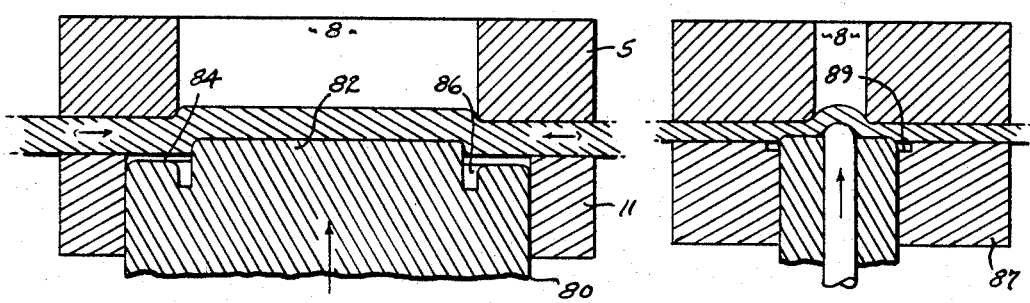
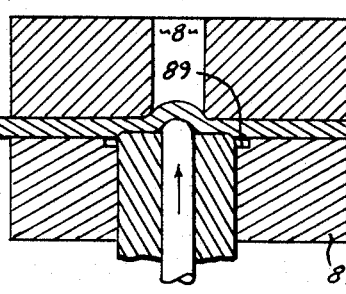
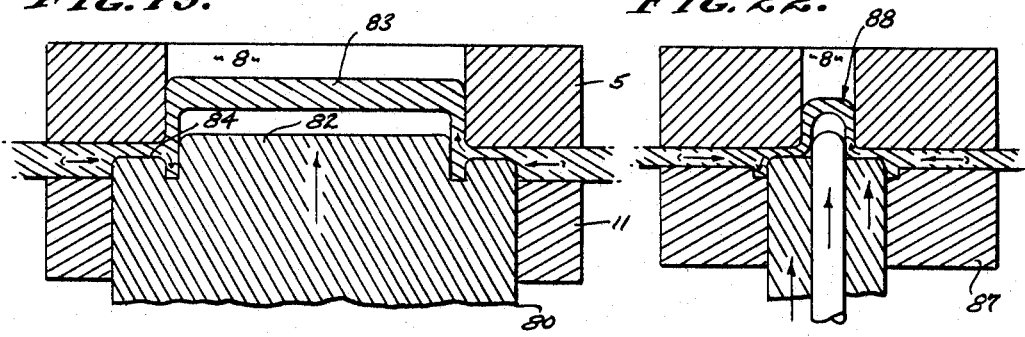
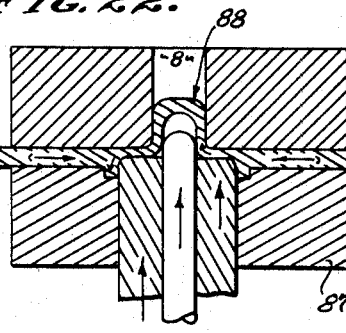
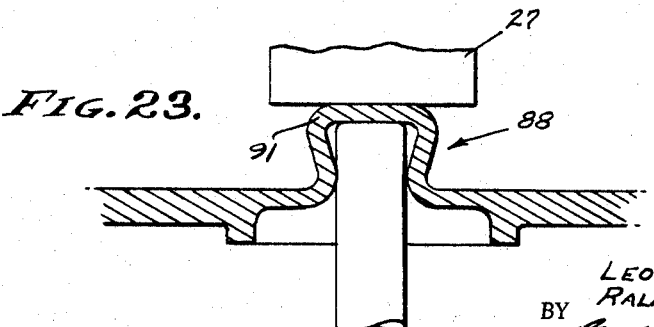
INVENTORS.
LEO M. HARVEY
RALPH W. HILTON
BY
Attorney

United States Patent Office 3,387,481
Patented June 11, 1968

3,387,481
PROCESS FOR THE DEFORMATION OF
SHEET MATERIAL
Leo M. Harvey, Los Angeles, and Ralph W. Hilton, Torrance, Calif., assignors to Harvey Aluminum (Incorporated), Torrance, Calif., a corporation of California
Continuation-in-part of application Ser. No. 468,449, June 30, 1965, which is a continuation of application Ser. No. 417,567, Dec. 11, 1964, now Patent No. 3,221,924. This application Feb. 27, 1967, Ser. No. 618,883
19 Claims. (Cl. 72—379)

ABSTRACT OF THE DISCLOSURE

The present invention relates to a method for the deformation of sheet material to form either solid or hollow projections extending therefrom. The manufacture of integrally formed projections in sheet material, of, for example, malleable metal and synthetic resins, is carried out by compressing to a plastic state a first area of the sheet surrounding a second area of the sheet upon which the projection is to be formed. To prevent the formation of wrinkles in areas of the sheet about the projection, a third area of the sheet lying contiguous to and surrounding the first area is held under a compressive force sufficient to prevent outward radial flow of resultant plastic material in the first zone without causing permanent deformation of the third area of the sheet.

---

This is a continuation-in-part of pending application Ser. No. 468,449, filed June 30, 1965, now abandoned, which is a continuation of application Ser. No. 417,567, filed Dec. 11, 1964, now Patent No. 3,221,924.

In the conventional deformation of sheet stock, such as by deep drawing, a punch pulls the sheet into a die cavity. Deformations thus formed are stressed in tension beyond the yield point causing work hardening and embrittlement. Also, due to localized friction about the edges of the die and punch, excessive stresses develop. At these points of high stress, the sheet is often stretched until it ruptures or tearing thereof occurs. Additionally, a bending moment caused by the punch can cause undesired wrinkling of the sheet about the periphery of the punch.

In cases where wrinkling of the sheet is severe and cannot be tolerated, it has heretofore been necessary to deform sheet material by the stretch forming process. In this operation, a pair of opposed pressure pads stationed about the punch engage the sheet and compress it with a force below the plastic limit of the material. Tearing and rupture of the sheet in stretch forming still occurs, however, due to localized stresses and friction about the die and punch.

In the adaptation of these conventional forming operations to the manufacture of rivets integral with the sheet, a plurality of stretching and bending steps are necessary in shaping a hollow tube from which the rivet is formed (see U.S. Patent No. 3,191,594). The stretching and bending steps used in forming result in work hardening and embrittlement of the hollow projection; consequently, such projections do not lend themselves to the construction of rivets and often rupture under moderate stresses.

It is therefore a principal object of the invention to provide an improved process for the deformation of sheet stock which can be carried out in one step without a plurality of stretching operations.

Another object is to provide an improved process of deforming sheet stock without resultant cold work and wrinkling of the sheet.

Yet another object is to provide an improved impact extrusion process which can be used in forming hollow or solid projections in sheet stock.

Still another object is to provide an improved process of forming a rivet in sheet stock.

A further object is to provide an improved process of coining decorative designs on sheet material.

These and other objects and advantages of the invention will become apparent by reference to the following description, drawings, and claims appended hereto.

To attain the foregoing objects, deformation of malleable sheet stock is achieved by compressing to a plastic state a first area of the sheet surrounding a second area of the sheet upon which a deformation is to be formed, and holding under compression a third area of the sheet lying contiguous to and surrounding the first area. To prevent wrinkling, a third area of the sheet is subjected to a compressive force less than the elastic limit of the material, but sufficient to prevent outward radial flow of resultant plastic material in the first area. By thus prohibiting the outward radial flow of plastic material, the compressive force applied to the first area facilitates inward plastic flow into the second area.

The first area lying peripheral to and surrounding the construction to be formed need only be compressed to the plastic limit of the sheet stock to cause plastic flow, the compressive force applied depending upon the characteristics of the material from which the sheet is fabricated. Although the compressive force can be applied gradually to the first area, it is preferred to impact extrude the sheet as described in Impact and Cold Extrusion of Metals, J. L. Everhart, Chemical Publishing Company, Inc., New York (1946), the disclosure therein being made a part hereof.

The compressive force used in causing plastic flow is preferably applied by means of a ram press co-acting with a die. This compressive force can also suitably be applied hydraulically or by conventional high energy impacting methods, such as, by expositive impacting. Regardless of the apparatus employed, it is only necessary that an area of the sheet surrounding another area of the sheet be compressed to cause plastic flow of the sheet material.

By the application to the third area of a compressive force below the elastic limit of the sheet material, it was unexpectedly found that wrinkles and other deformations in the sheet no longer develop. In practice, compressive forces of less than half the elastic limit of the sheet material satisfactorily prohibit the plastic flow of sheet material into the third area, it being preferred to employ in the third area compressive forces of from about 25 to 99, more preferably of from about 50 to 75 percent of the elastic limit of the sheet material.

The area of the sheet to be plasticized and the hardness of the sheet material determines, in large part, the optimum compressive force to be applied to the third area. The compressive force is believed to create a hoop stressed boundary surrounding the first and second areas, this boundary being under sufficient stress to prohibit outward radial flow of sheet material. The stress in the boundary necessary to prevent outward radial flow can be readily calculated by one skilled in the art, although, as a general rule, the third area need be no larger than about twice that of the first area.

The above described process is particularly suitable in deforming sheet stock of, for example, aluminum, steel, wrought iron, zinc, copper, lead, titanium, zirconium, and other like malleable metals. Advantageously, the process can also be used in deforming sheets of thermoplastic synthetic resin, such as, vinyl acetate, vinyl chloride and vinylidene chloride. In this latter case, it is preferable to preheat the sheet to the softening point of the resin before shaping. By use of the present process, rivets, lugs, bosses, fasteners, tubes, honeycomb structures, and the like can be formed integral with sheet stock in a one step operation.

The invention is illustrated further in the accompanying drawings in which:

FIGS. 9 and 10 are diagrammatic cross sections showing the apparatus used in forming on sheet material a hollow open projection;

FIGS. 11 and 12 are diagrammatic cross sections showing the apparatus used in forming on sheet material a two way hollow projection with open ends and a closed center;

FIGS. 13 and 14 are diagrammatic cross sections showing the apparatus used in forming on sheet material a two way solid projecting lug;

FIGS. 15 and 16 are diagrammatic cross sections showing the apparatus used in forming on sheet material a two way hollow projection with an opening therethrough.

FIGS. 17, 18 and 19, are diagrammatic cross sections showing the apparatus used in forming on one side of sheet material a hollow projection with an end closure and aligned with the walls of the projection, a reinforcing lug projection from the other side of the sheet;

FIGS. 20, 21, and 22, are diagrammatic cross sections showing the apparatus used in forming on one side of sheet material a hollow projection with an end closure, and offset from the walls of the projection, a reinforcing lug projecting from the other side of the sheet;

FIG. 23 is a detailed cross section of the article produced in FIGS. 20 to 22, illustrating the process of forming a fastener on the sheet.

Figure 1:
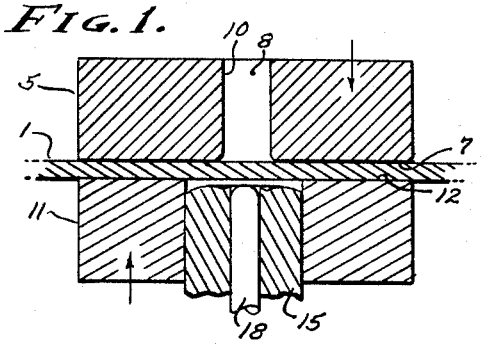
FIGS. 1 to 3 are diagrammatic cross sections of the apparatus used to form on sheet material a hollow projection with an end closure.

Referring now to the drawings, sheet stock of a malleable metal, showng generally at 1, is brought into contact with die 5 having an orifice 8 therein (FIG. 1). The orifice 8 having walls 10 can be of any configuration, it being preferred in most applications to employ a circular orifice. A reciprocating pressure pad 11 having a face 12 opposing face 7 of the die holds the sheet material under compression while ram press 15, reciprocating in frictional engagement with pressure pad 11, compresses the sheet to the plastic state. A mandrel 18 longitudinally displaceable in ram press 15 serves in channeling the plastic material into the orifice.

Figure 2:
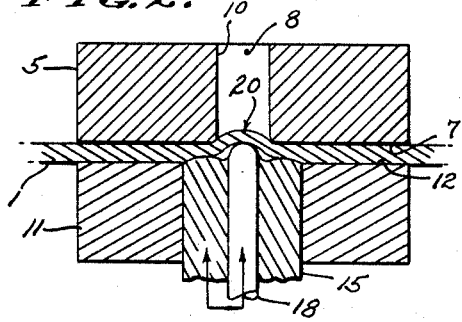
Figure 3:
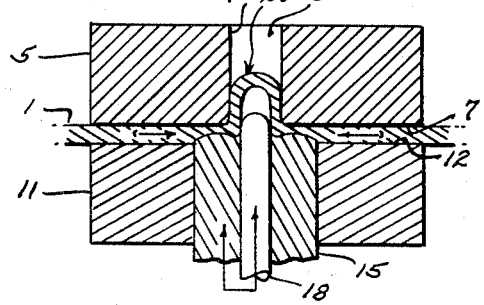

In forming a hollow projection with an end closure, the pressure pad cooperating with the die compresses the sheet to prevent outward radial flow of material being extruded by ram press 15. As sheet material between the die and ram press becomes plastic and begins to flow into the orifice, mandrel 8 moves upwardly through the mandrel and into the orifice (FIGS. 2 and 3). By the initial joint advance of press 15 and mandrel 18, the material forming the projection 20 is extruded along walls 10 of orifice 8. After its entrance into the orifice 8, mandrel 18 preferably remains stationary while press 15 advances forward to extrude material into the annulus, the walls of the hollow body 20 being formed between the mandrel 18 and die walls 10. Extrusion of the sheet is continued until projection 20 extends to the desired length, or else, no further reduction in the wall thickness of the sheet caused by extrusion can be tolerated.

Figure 4:
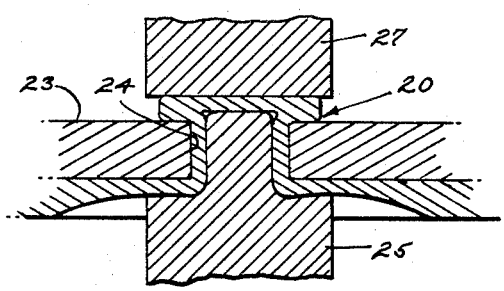
FIG. 4 is a detailed cross section of the apparatus used to flatten the head of the projection produced according to FIGS. 1 to 3, the resultant rivet being used to fasten another member to the sheet.

If desired, the resultant hollow projection with an end closure produced as in FIGS. 1 to 3 can be used to secure sheet 1 to another member. As shown in FIG. 4, for example, sheet 23 having an aperture 24 therein is riveted to sheet 1, the projection 20 extending through aperture 24. This operation can be accomplished by the insertion of tool 25 into hollow projection 20 whereupon a hammer or tool 27 compresses and flattens the head of the projection to form a rivet. Rivets formed integral with sheet material are particularly satisfactory for use in can tops to secure flip flop handles thereto.

Figure 5:
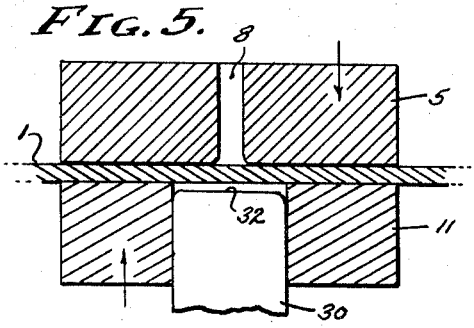
FIGS. 5 and 6 are diagrammatic cross sections of the apparatus used to form a lug or solid projection on sheet material.
Figure 6:
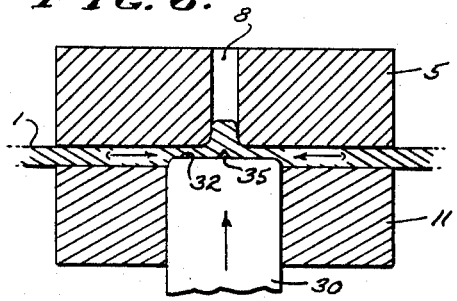

Solid projections, such as lugs, can similarly be formed in sheet material by employing a ram press 30 having a relatively flat head 32 (FIGS. 5 and 6). In this process, sheet 1 between die 5 and pressure pad 11 is compressed with sufficient force to prevent outward radial flow of plastic material while ram 30 extrudes material from the sheet into orifice 8. Since there is a tendency for the material to flow into the orifice around the sides thereof and form a hollow tube, it is preferable when forming a solid projection to use a die with a relatively small orifice. Even then, a small recess or indentation 35 is formed on the side of the sheet being compressed.

Figure 7:
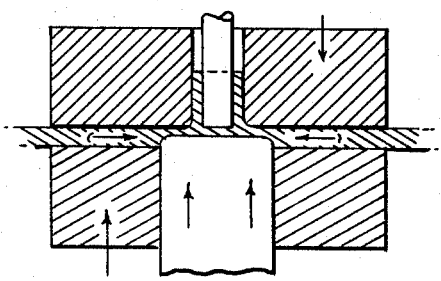
FIG. 7 is a diagrammatic cross section of an apparatus used in forming on sheet material a hollow open ended projection.
Figure 8:
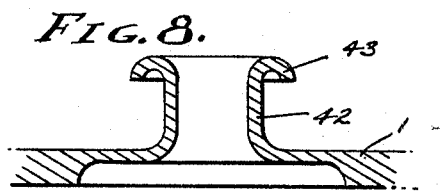
FIG. 8 is a cross sectional view of the hollow open ended projection produced in FIG. 7, with the head thereof crimped over to form a rivet.

According to the present process, a hollow projection with an open end can also be formed by the insertion of a die post 38 in orifice 8 (FIG. 7). The post 38 spaced from wall 10 of the orifice forms an annulus 41 through which plastic material flows to form projection 42. At the outset, post 38 rests on sheet 1, but as plastic flow begins, the post exerts a pressure on the side of the sheet. The head 43 of projection 42 can then be bent or crimped over as in FIG. 8 to form yet another type of rivet.

In another embodiment, a hollow open projection is formed in sheet material by the insertion in orifice 8 of a reciprocating post 45. As plastic flow commences, the sheet material between post 45 and face 32 of press 30 is compressed until the sheet is punctured (FIGS. 9 and 10). In practice, it is preferable to first move post 45 forward into the sheet and then backwardly to minimize flash between press 30 and post 45. The hollow open projection formed in this manner can be advantageously employed in riveting the sheet to another member.

In another preferred embodiment, two opposing ram presses 47 and 49 having reciprocating therein die posts 51 and 53, respectively, are used to form on sheet material a two way hollow projection with open ends and closed center (FIGS. 11 and 12). In operation, die posts 51 and 53 which are in contact with the surface of the sheet remain stationary as ram presses 47 and 49 compress the surrounding sheet. The spacing between the die posts and ram presses forms annuli 55 and 57 into which plastic flow occurs to form walls of the projection. As shown in FIGS. 11 and 12, a pair of opposed pressure pads 60, 62 retain an area of the sheet adjacent presses 47, 49 under a compressive force sufficient to prohibit outward radial flow of the plastic metal.

Where it is desired to form solid projections or lugs, extending from both sides of sheet material, a pair of ram presses 65, 67 having recesses 69, 71 respectively, in the faces thereof are employed (FIGS. 13 and 14). Compression of the sheet between presses 65 and 67 to above the plastic limit causes plastic flow of material into recesses 69 and 71. Such solid projections on sheet material serve as a flange onto which another member can be affixed.

In still another preferred embodiment shown in FIGS. 15 and 16, ram presses 47 and 49 are provided with reciprocating die posts 74, 76, respectively. These die posts preferably move forward before or during the extrusion operation to form an aperture completely through the sheet. The resultant two way hollow projection having an opening completely therethrough can suitably be used to rivet members to both sides of the sheet.

In another embodiment, a hollow projection 83, with a closed end is formed on one side of the sheet and a reinforcing lug in alignment with the wall of the projection is formed on the other side of the sheet (FIGS. 17 to 19). In deforming the sheet, there is employed ram press 80 having a projecting portion 82, a slightly recessed face 84 and indentation or groove 86 in the face thereof. In this operation, press portion 82 first dimples or stretches sheet 1 whereupon press face 84 comes into contact therewith to subsequently extrude same. The sheet material being extruded then flows into the orifice as well as into recess 86.

In FIGS. 20 to 22, a hollow projection 88 with a closed end is formed on one side of the sheet and a reinforcing lug offset from the wall of the projection is formed on the other side of the sheet. This process is carried out as in FIGS. 1 to 3 except that pressure pad 87 is employed with a recessed portion 89 adjacent ram press 15. As plastic flow commences, material flows both into orifice 8 as well as radial outwardly into recess 89. The projection 88 thus formed can then be slightly flattened as in FIG. 23 to form a fastener 91.

It will be understood that the process of the present invention can be used to form any type of deformation in sheet material. This process can, for example, be advantageously used in coining numbers or in printing characters or the like on either metal or thermoplastic sheet material. The process is particularly applicable in forming on sheet material rivets that are integral therewith.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are promptly, equitably, and intended to be, within the full range of equivalence of the following claims.

What we claim is:
1. In a process of deforming sheet stock of a malleable material, said process comprising:
 (a) compressing to a plastic state a first area of the sheet adjacent a second area of the sheet upon which a deformation is to be formed; and
 (b) holding under compression a third area of the sheet lying contiguous to the first area, said third area being subjected to a compressive force sufficient to prohibit outward radial flow of resultant plastic material in the first area without causing permanent deformation of the third area.

2. Process as defined by claim 1, wherein a portion of the second area of the sheet is held under a compressive force sufficient to prevent substantial deformation thereof.

3. Process as defined by claim 1, wherein a portion of the second area of the sheet is subjected to a compressive force sufficient to plasticize the material and completely penetrate same.

4. Process as defined by claim 1, wherein there is applied on one side of the sheet over the second area a sufficient pressure to prohibit flow of resultant plastic material transversely of the one side.

5. Process as defined by claim 4, wherein there is applied on the other side of the sheet within the second area a sufficient pressure to channel the flow of resultant plastic material into a desired shape.

6. Process as defined by claim 1, wherein there is applied on one side of the sheet within the second area a pressure sufficient to displace into the desired shape the resultant plastic material flowing from the first area.

7. Process as defined by claim 6, wherein there is applied to the other side of the sheet within the second area a pressure sufficient to prohibit deformation of the sheet surface.

8. Process as defined in claim 1, wherein said malleable material is a metal selected from the group consisting of aluminum, bronze, copper, lead, steel, wrought iron, zinc, titanium, and zirconium.

9. Process as defined by claim 1, wherein the malleable material is an aluminum alloy.

10. Process as defined by claim 1, wherein said malleable material is a thermoplastic resin.

11. Process as defined by claim 1 wherein the first area of the sheet is compressed hydraulically.

12. Process as defined by claim 1, wherein the first area of the sheet is compressed by explosive impacting.

13. Process as defined by claim 1, wherein the first area surrounds the second area and the third area surrounds the first area.

14. In a process of deforming sheet stock of a malleable material, said process comprising:
 (a) placing one side of the sheet on a die having at least one orifice therein;
 (b) bringing into contact with the other side of the sheet surrounding the orifice a movable member, the compressive force applied to the sheet between the die and movable member being sufficient to cause plastic flow of the material into the orifice; and
 (c) holding an area of the sheet contiguous to and surrounding the member under a compressive force sufficient to prevent outward radal flow of material without causing permanent deformation of the sheet.

15. Process as defined by claim 14, further characterized in that as plastic flow into the orifice commences, a mandrel having a diameter smaller than the orifice is inserted therein, whereby to form on the sheet a hollow projection with an end closure.

16. Process as defined by claim 15, wherein the sheet deformed is the wall of a can upon which an opener having an aperture therein is to be riveted, the opener being riveted thereto by insertion of the hollow projection through the aperture and then flattening the end closure of the projection over the opener.

17. Process as defined by claim 14, wherein resultant plastic material flows into the orifice and around a stationary die post therein, thereby to form on the sheet a hollow projection with an open end.

18. Process as defined by claim 14, wherein as plastic flow commences, a punch moves into the orifice and completely through the sheet, thereby to form a hollow open projection on the sheet.

19. Process as defined by claim 14, wherein the moveable member is provided with a recess on its face into which at least a portion of resultant plastic material flows.

References Cited
UNITED STATES PATENTS

| | | | |
|---|---|---|---|
| 2,438,837 | 3/1948 | Archer et al. | 72—354 |
| 2,452,628 | 11/1948 | Bartlett et al. | 72—370 |
| 2,909,281 | 10/1959 | Koskinen | 72—377 |
| 3,050,849 | 8/1962 | Etchison et al. | 72—379 |

CHARLES W. LANHAM, *Primary Examiner.*

L. A. LARSON, *Assistant Examiner.*